(12) United States Patent
Yafouz

(10) Patent No.: US 9,783,034 B2
(45) Date of Patent: Oct. 10, 2017

(54) VEHICLE SHADE SYSTEM

(71) Applicant: Marwan Ahmed Mohammed Yafouz, Jedday at Sharfiah (SA)

(72) Inventor: Marwan Ahmed Mohammed Yafouz, Jedday at Sharfiah (SA)

( * ) Notice: Subject to any disclaimer, the term of this patent is extended or adjusted under 35 U.S.C. 154(b) by 24 days.

(21) Appl. No.: 14/965,229

(22) Filed: Dec. 10, 2015

(65) Prior Publication Data

US 2017/0166040 A1    Jun. 15, 2017

(51) Int. Cl.
*B60J 11/02*     (2006.01)

(52) U.S. Cl.
CPC ................... *B60J 11/025* (2013.01)

(58) Field of Classification Search
CPC ........................................... B60J 11/025
USPC ....................................... 296/95.1
See application file for complete search history.

(56) References Cited

U.S. PATENT DOCUMENTS

| | | | | |
|---|---|---|---|---|
| 2,078,183 A | * | 4/1937 | Ray | G09F 21/04 296/21 |
| 2,620,579 A | * | 12/1952 | Dienes | G09F 21/04 40/591 |
| 5,433,499 A | * | 7/1995 | Wu | B60J 11/02 296/136.02 |
| 5,893,226 A | * | 4/1999 | Sophocleous | G09F 17/00 40/591 |
| 6,012,759 A | * | 1/2000 | Adamek | B60J 11/02 296/136.03 |
| 6,588,133 B1 | * | 7/2003 | Garrity | G09F 17/00 40/591 |
| 2002/0078987 A1 | * | 6/2002 | Montes | B60J 11/00 135/87 |
| 2006/0124164 A1 | * | 6/2006 | Pacheco | B60J 11/02 135/88.05 |

FOREIGN PATENT DOCUMENTS

TW          EP 1068975 A2  *  1/2001  ............. B60J 11/02

* cited by examiner

*Primary Examiner* — Pinel Romain

(57) ABSTRACT

A sheet of sun blocking material has a forward edge, a rear edge, and side edges. At least one forward suction cup is attached to the front edge of the sheet. The forward suction cup is removably coupled to a vehicle between the headlights. A box has a slot exteriorly and a roller interiorly. The sheet extends through the slot. The rearward edge of the sheet is attached to the roller. A spring urges the roller with the sheet to an inoperative coiled orientation within the box. At least one rearward suction cup is attached to the box. The rearward suction cup is removably coupled to the rear window of the vehicle.

1 Claim, 4 Drawing Sheets

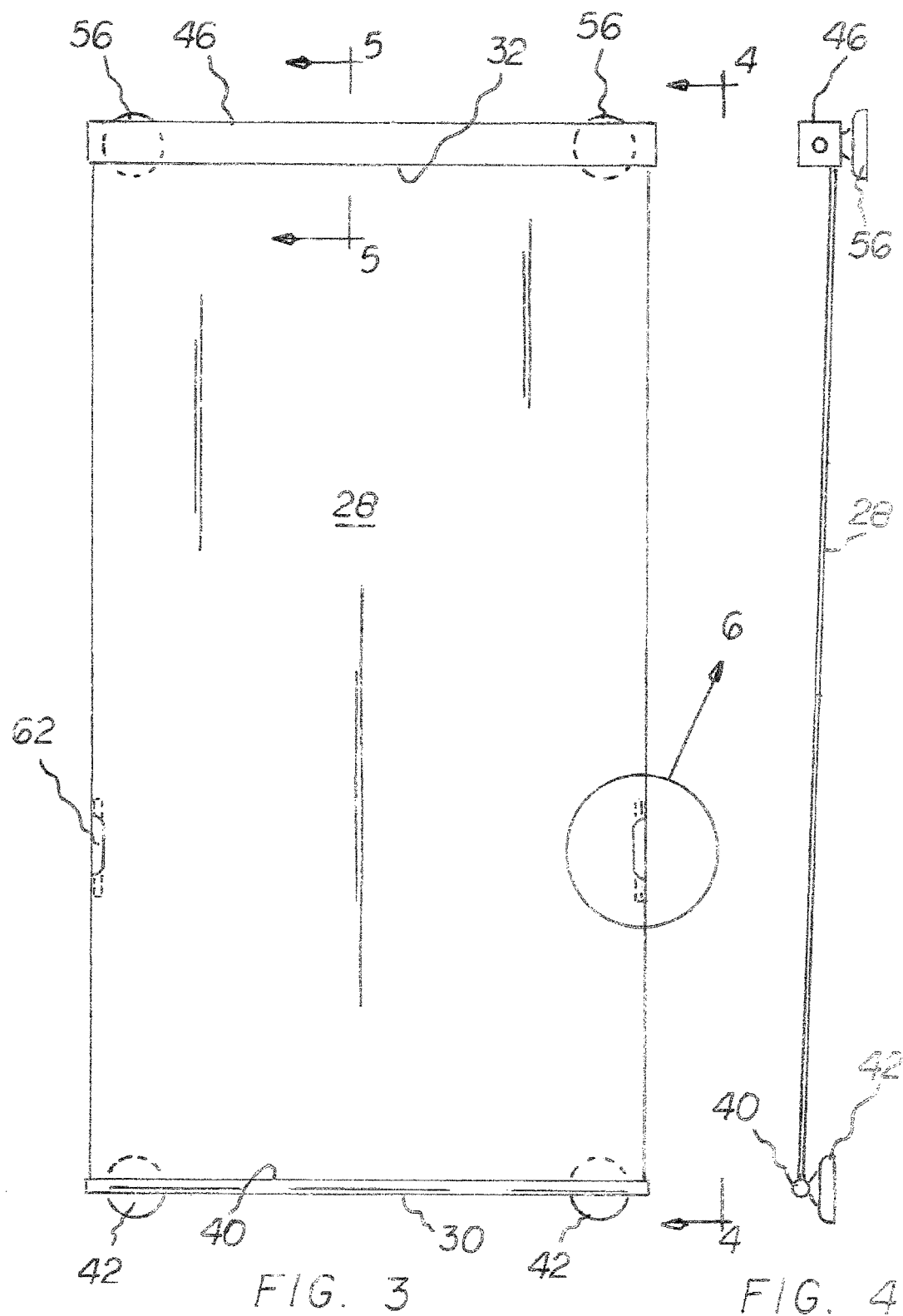

VEHICLE SHADE SYSTEM

BACKGROUND OF THE INVENTION

Field of the Invention

The present invention relates to a vehicle shade system and more particularly pertains to retractable positioning over an upper central extent of a vehicle when not in use, for abating overheating of the vehicle when utilizing the system, the retractable positioning and the abating overheating being done in an energy-saving, safe, convenient, and economical manner.

SUMMARY OF THE INVENTION

In view of the foregoing disadvantages inherent in the known types of xother now present in the prior art, the present invention provides an improved vehicle shade system. As such, the general purpose of the present invention, which will be described subsequently in greater detail, is to provide a new and improved vehicle shade system and method which has all the advantages of the prior art and none of the disadvantages.

From a broad viewpoint, the present invention is a vehicle shade system for use with a vehicle having headlights, a back, a central passenger cabin, a rear window, a front windshield, and side mirrors. A sheet of sun blocking material has a forward edge, a rear edge, and side edges. At least one forward suction cup is attached to the front edge of the sheet. The forward suction cup is removably coupled to a vehicle between the headlights. A box has a slot exteriorly and a roller interiorly. The sheet extends through the slot. The rearward edge of the sheet is attached to the roller. A spring urges the roller with the sheet to an inoperative coiled orientation within the box. At least one rearward suction cup is attached to the box. The rearward suction cup is removably coupled to the rear window of the vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle shade system which has all of the advantages of the prior art shade systems and none of the disadvantages.

It is another object of the present invention to provide a new and improved vehicle shade system which may be easily and efficiently manufactured and marketed.

It is a further object of the present invention to provide a new and improved vehicle shade system which is of durable and reliable constructions.

An even further object of the present invention is to provide a new and improved vehicle shade system which is susceptible of a low cost of manufacture with regard to both materials and labor, and which accordingly is then susceptible of low prices of sale to the consuming public, thereby making such vehicle shade system economically available to the buying public.

Lastly, another object of the present invention is to provide a vehicle shade system for retractable positioning over an upper central extent of a vehicle when not in use, for abating overheating of the vehicle when utilizing the system, the retractable positioning and the abating overheating being done in an energy-saving, safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system similar to FIG. 1 but with the system removed from the car.

FIG. 4 is a side elevational view of the system taken along line 4-4 of FIG. 3.

The same reference numerals refer to the same parts throughout the various Figures.

DESCRIPTION OF THE PREFERRED EMBODIMENT

Figure 1:
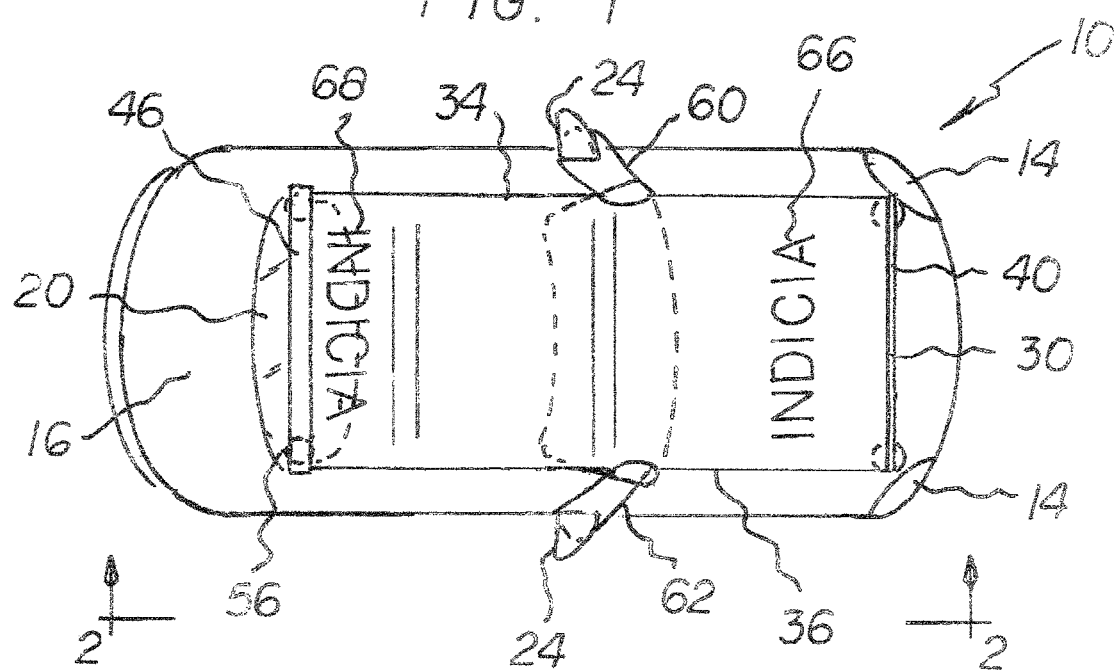
FIG. 1 is a plan view of a vehicle shade system constructed is accordance with the principles of the present invention, the system shown operationally positioned on a car.
Figure 2:
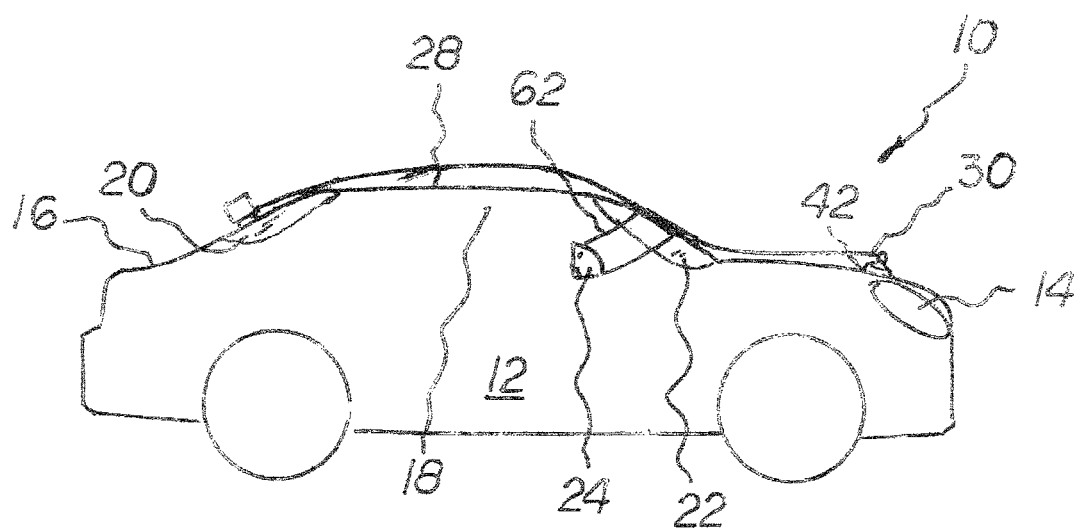
FIG. 2 is a side elevational view of the system taken along line 2-2 of FIG. 1.
Figure 5:
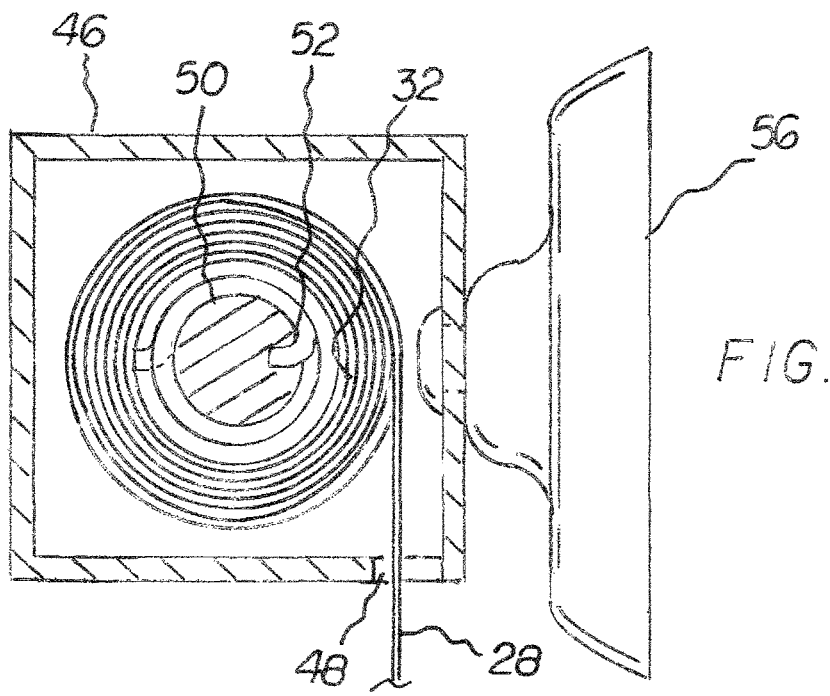
FIG. 5 is a cross sectional view of the system taken along line 5-5 of FIG. 3.
Figure 6:
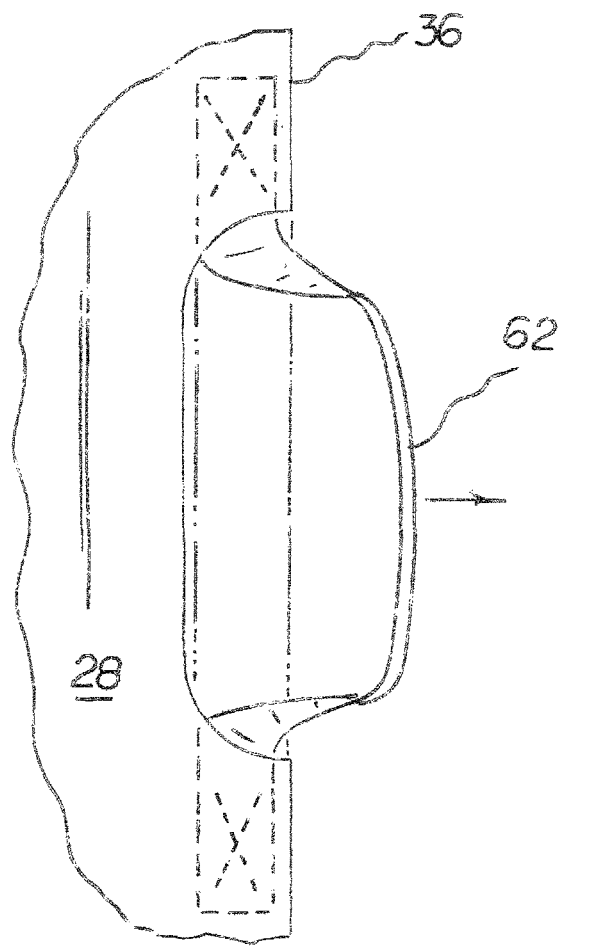
FIG. 6 is an enlarged showing of a handle taken at circle 6 of FIG. 3.

With reference now to the drawings, and in particular to FIG. 1 thereof, the preferred embodiment of the new and improved vehicle shade system embodying the principles and concepts of the present invention and generally designated by the reference numeral 10 will be described.

The present invention, the vehicle shade system 10 is comprised of a plurality of components. Such components in their broadest context include a sheet of sunblocking material, a box, a forward suction cup, and a rearward suction cup. Such components are individually configured and correlated with respect to each other so as to attain the desired objective.

From a specific viewpoint, the present invention is a vehicle shade system.

First provided is a vehicle 12. The vehicle has laterally spaced headlights 14. The headlights are provided in the front. The vehicle has a trunk 16. The trunk is provided in back. The vehicle has a central passenger cabin 18. The passenger cabin is provided between the laterally spaced headlights and the trunk. The vehicle also has a rear window 20. The rear window is provided between the passenger cabin and the trunk. The vehicle also has a front windshield 22. The front windshield is provided between the passenger cabin and the headlights. The vehicle also has side mirrors 24. The side mirrors are provided exteriorly laterally of the front windshield.

A sheet 28 of sun blocking material is provided. The sheet is generally rectangular in configuration. The sheet has a forward edge 30. The sheet has a rearward edge 32. The sheet has a left side edge 34. The sheet has a right side edge 36. The sheet is fabricated of a flexible, fire retardant, heat proof, fire proof, water proof, anti-static material.

A forward bar 40 is provided. The forward bar has two laterally spaced forward suction cups 42. The forward suction cups are attached to bar at the front edge of the sheet adjacent to the left and right side edges respectively. The two forward suction cups are removably coupled to the vehicle between the laterally spaced headlights during use.

A box 46 in is provided. The box is generally rectilinear in configuration. The box has a slot 48. The slot is provided exteriorly. The slot has a journaled roller 50. The journaled roller is provided interiorly. The sheet extends through the slot. The rearward edge of the sheet is attached to the roller. The box has a spring 52. The spring urges the roller with the sheet to a coiled orientation within the box.

Provided next are two rearward suction cups 56. The rearward suction cups are attached to the box at laterally spaced locations. The two rearward suction cups are rearwardly coupled to the rear window of the vehicle. The forward and rearward suction cups have a diameter of 10 centimeters plus or minus 20 percent. Although two laterally spaced forward suction cups and two laterally spaced rearward suction cups are used in the disclosed primary, preferred embodiment, it should be understood that a single centrally located front suction cup could be utilized and, similarly, a single centrally located rear suction cup could be utilized.

Further provided is a left side strap 60. The left side strap is attached to the left side edge of the sheet at a central extent of the sheet. A right side strap 62 is provided. The right side strap is attached to the left side edge of the sheet at a central extent of the sheet. The left and right side edges of the sheet are recessed from a basic rectangular shape. In this manner left and right side straps are accommodated. The left and right side edges of the sheet are fabricated of an elastic material. The left and right side edges are positioned respectively over the side mirrors during use. The left and right side straps each have a length of 40 centimeters plus or minus 20 percent and a width of 2.5 centimeters plus or minus 20 percent.

Figure 7:
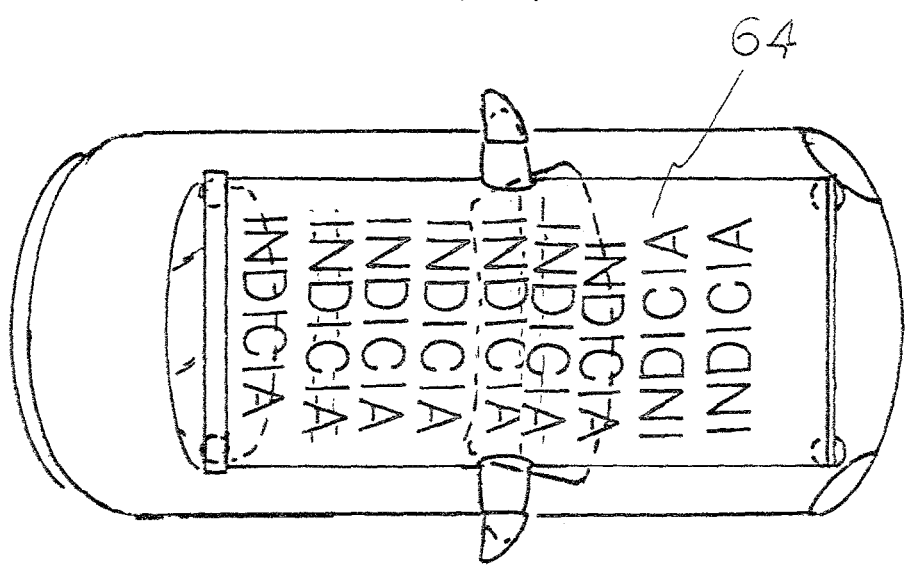
FIG. 7 is a plan view of the vehicle shade system similar to FIG. 1 illustrating indicia covering the entire sheet.

Provided last is indicia 64 on the sheet. The indicia includes forward indicia 66 and rearward indicia 68. The forward indicia is on the sheet forwardly of the front windshield. The rearward indicia is on the sheet rearwardly of the front windshield and forwardly of the box. It should be understood, however, that indicia of any type and of any amount may be provided on the sheet at any location. Note FIG. 7 which illustrates indicia covering the entire sheet.

The vehicle shade external roller with pull back spring of the present invention works by installing it in the rear window of the vehicle by vacuum suction cups then pulling the fabric which is made to be fire retardant, heat proof, waterproof, and antistatic. The fabric is attached to the side mirrors through a stretch fabric sewn in empty space snipped from the basic rectangular shape. It will go around the side mirrors. It will also be installed in front of the vehicle at the end of the hood by suction cups. It functions to lower the cabin temperature and also the engine, air conditioner passage, and radiator from direct sun and water damage. The fabric will also be used for advertising and slogans by companies in addition to printing artistic colorful patterns to suit consumers taste. It will be available in different sizes for different vehicles. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle shade system (10) for retractable positioning over an upper central extent of a vehicle (12) when not in use, for abating overheating of the vehicle when utilizing the system, the retractable positioning and the abating of overheating being done in an energy-saving, safe, convenient, and economical manner, the system comprising in combination:

the vehicle (12) having laterally spaced headlights (14) in front and a trunk (16) in back and a central passenger cabin (18) between the laterally spaced headlights and the trunk, the vehicle also having a rear window (20) between the central passenger cabin and the trunk, the vehicle also having a front windshield (22) between the central passenger cabin and the laterally spaced headlights, the vehicle also having side mirrors (24) exteriorly laterally of the front windshield;

a sheet (28) of sun blocking material having a generally rectangular configuration with a forward edge (30) and a rearward edge (32) and a left side edge (34) and a right side edge (36), the sheet being fabricated of a flexible, fire retardant, heat proof, fire proof, water proof, anti-static material;

a forward bar (40) with two laterally spaced forward suction cups (42) attached to bar at the front edge of the sheet adjacent to the left and right side edges respectively, the two forward suction cups removably coupled to the vehicle between the laterally spaced headlights during use;

a box (46) in a generally rectilinear configuration with a slot (48) exteriorly and a journaled roller (50) interiorly, the sheet extending through the slot with the rearward edge of the sheet attached to the roller, a spring (52) urging the roller with the sheet to a coiled orientation within the box;

two rearward suction cups (56) attached to the box at laterally spaced locations, the two rearward suction cups removably coupled to the rear window of the vehicle, the forward and rearward suction cups having a diameter of 10 centimeters Plus or minus 20 percent;

a left side strap (60) attached to the left side edge of the sheet at a central extent of the sheet, a right side strap (62) attached to the left side edge of the sheet at a central extent of the sheet, the left and right side edges of the sheet being recessed from a basic rectangular shape to accommodate the left and right side straps, the left and right side edges of the sheet being fabricated of an elastic material and positioned respectively over the side mirrors during use, the left and right side straps each having a length of 40 centimeters plus or minus 20 percent and a width of 2.5 centimeters plus or minus 20 percent; and indicia (64) on the sheet, the indicia including a forward indicia (66) on the sheet forwardly of the front windshield, the indicia including a rearward indicia (68) on the sheet rearwardly of the front windshield and forwardly of the box.

\* \* \* \* \*